United States Patent
Groeke et al.

(10) Patent No.: US 7,980,039 B2
(45) Date of Patent: Jul. 19, 2011

(54) DEVICE FOR CONNECTING AND INTERLOCKING OF TWO BASE PLATES, ESPECIALLY FLOOR PANELS

(75) Inventors: Carsten Groeke, Berlin (DE); Thomas Grafenauer, Ouzouer-sur-Loire (FR)

(73) Assignee: Flooring Technologies Ltd., Pieta (MT)

( * ) Notice: Subject to any disclaimer, the term of this patent is extended or adjusted under 35 U.S.C. 154(b) by 324 days.

(21) Appl. No.: 12/202,864

(22) Filed: Sep. 2, 2008

(65) Prior Publication Data

US 2009/0100782 A1    Apr. 23, 2009

(30) Foreign Application Priority Data

Sep. 6, 2007 (DE) .......... 10 2007 042 250

(51) Int. Cl.
*E04B 5/00* (2006.01)
*E04C 2/38* (2006.01)

(52) U.S. Cl. .............. 52/582.2; 52/586.2; 52/592.1; 403/350

(58) Field of Classification Search .......... 52/582.1, 52/582.2, 584.1, 586.1, 586.2, 592.1, 592.4; 403/364, 339, 350
See application file for complete search history.

(56) References Cited

U.S. PATENT DOCUMENTS

| | | | | |
|---|---|---|---|---|
| 4,417,430 A | * | 11/1983 | Loikitz | 52/582.2 |
| 5,424,118 A | * | 6/1995 | McLaughlin | 428/314.8 |
| 7,621,092 B2 | * | 11/2009 | Groeke et al. | 52/586.1 |
| 2004/0211143 A1 | * | 10/2004 | Hanning | 52/578 |
| 2007/0006543 A1 | | 1/2007 | Engstrom | |
| 2007/0028547 A1 | * | 2/2007 | Grafenauer et al. | 52/586.1 |
| 2008/0134607 A1 | * | 6/2008 | Pervan et al. | 52/395 |
| 2009/0019806 A1 | * | 1/2009 | Muehlebach | 52/588.1 |

FOREIGN PATENT DOCUMENTS

| | | |
|---|---|---|
| EP | 1 415 056 | 4/2002 |
| WO | WO 03016654 A1 * | 2/2003 |
| WO | WO 2006/043893 | 4/2006 |
| WO | 2008/004960 | 1/2008 |

* cited by examiner

*Primary Examiner* — Brian E Glessner
*Assistant Examiner* — Jessie Fonseca
(74) *Attorney, Agent, or Firm* — Andrew M. Calderon; Roberts Mlotkowski Safran & Cole, P.C.

(57) ABSTRACT

A device for connecting and locking two building boards, in particular floor panels, on their longitudinal sides and/or transverse sides in the horizontal and vertical direction through an essentially vertical joining movement. The building boards have a top side and an underside. On their lateral edges to be connected to one another are provided with profiles corresponding to one another. A locking element with a locking projection is provided in the profile of the first building board. The locking projection interacts with a locking depression provided in the profile of the second building board such that the two building boards are automatically locked in the vertical direction with the joining movement. The locking element is embodied in an essentially rigid manner and the locking projection can be brought into the locking depression through a rotary motion of the locking element.

19 Claims, 23 Drawing Sheets

DEVICE FOR CONNECTING AND INTERLOCKING OF TWO BASE PLATES, ESPECIALLY FLOOR PANELS

CROSS REFERENCE TO RELATED APPLICATIONS

This present application claims priority under 35 U.S.C. §119 to German Patent Application No. 10 2007 042 250.6, filed on Sep. 6, 2007, the contents of which are incorporated in their entirety herein by reference.

BACKGROUND OF THE INVENTION

1. Field of the Invention

The invention relates to a device for connecting and locking two building boards, in particular floor panels, on their longitudinal sides and/or transverse sides in the horizontal and vertical direction through an essentially vertical joining movement, wherein the building boards have a top side and an underside, on their lateral edges to be connected to one another are provided with profiles corresponding to one another, and a locking element with a locking projection is provided in the profile of the first building board, which locking projection interacts with a locking depression provided in the profile of the second building board such that the two building boards are automatically locked in the vertical direction with the joining movement.

2. Discussion of Background Information

A device of this type is known, e.g., from EP 1 415 056 B1 and makes it possible to join two floor panels on their transverse sides. On the longitudinal sides the panels are connected by a tongue and groove profile milled out of the lateral edges. The tongue of the panel to be newly laid is thereby inserted into the groove of a panel already laid and the panel to be newly laid is then pivoted down onto the subfloor. On the transverse side the device makes it possible to simply join the panels by insertion in the vertical direction with a final light pressing in, wherein the locking projection then latches into the locking groove. The locking at the transverse side in the horizontal direction takes place through a hook-shaped profile of the lateral edges, which is milled out of the solid material. In the vertical direction the two panels are locked by the plastic insert that is inserted firmly in the profile of the one building board and has a laterally projecting resilient lip, which latches into an undercut that is made in the profile of the second building board (of the opposite lateral edge).

The connection of the plastic insert to the profile of the first panel is carried out by a web running in the horizontal direction that is inserted into a groove made horizontally in the lateral edge. The locking lip projecting from the locking element is compressed by the panel to be newly laid during the joining movement and springs out again when it overlaps with the undercut. The spring lip must be very elastic so that the automatic engagement occurs securely. The more elastic the embodiment of the spring lip, the lower the forces absorbable by it in the opposite direction (so-called pull-out forces), which act against the joining direction and release the connection. Commercial floor panels have a thickness of 6 to 12 mm. The groove to be made laterally in the profile of the lateral edge, in which groove the plastic insert is attached, must consequently be milled in a width of 2 to 3 mm and a depth of approx. 5 mm. The 1.5 to 3 mm thick plastic insert must then be placed into the groove. Both steps must be carried out at high machine speeds, which is not unproblematic. Through the thickness of the plastic insert, the vertical locking is limited to laminate floors with thicknesses of greater than 10 mm, which further restricts the applicability of the locking system.

When a high elasticity is necessary for the locking, on the one hand the material selection is very restricted, which can lead to increased costs or to increased production expenditure. High spring forces of the locking elements are then necessary if a secure and durable locking is to be ensured. Since this is generally the case with high-quality connections, the forces and deformations generated are usually correspondingly high. For laminate floor panels, a base board of a wood material, in particular HDF or MDF, is used. If high forces act on a laminate, such as HDF, on small areas lengthwise to the layer direction, damage occurs very quickly, in particular in tapered areas. This can mean that connections do not lock completely or at all. Furthermore, the mostly large deformations of the locking elements often lead to a weakening, in particular when the deformation exceeds the elastic range or the deformation lasts for a longer period. This can lead to reduced restoring forces of the locking elements and thus to only incomplete locking.

SUMMARY OF THE INVENTION

Based on this problem, the device described above is to be improved.

To solve the problem, a generic device is characterized in that the locking element is essentially embodied in a rigid manner and the locking projection can be brought into the locking depression by a rotary motion of the locking element. Through this embodiment no resilient means are necessary for locking the panels. Through the rotary motion a secure locking takes place that ensures high pull-out forces. Preferably the locking element is embodied in cross section in an essentially L-shaped manner and the locking projection is embodied in the area of the one end of one of the legs. Through the selection of the leg length and the width of the locking projection projecting from the one leg, the lowest possible forces for the initiation of the locking operation and the highest possible forces for releasing the locking can be adjusted through a suitable selection of the lever arms.

The locking element is inserted into the profile such that its one leg runs approx. at an angle of 70° to the horizontal. When the panel to be newly laid is lowered onto the subfloor, it comes into contact with the projecting leg and the locking element thereby rotates.

In a preferred embodiment the locking element can also be embodied in cross section in an essentially circular or annular manner. In this embodiment, the profile on the lateral edge of the first building board is embodied such that the locking element is arranged in an essentially semicylindrical groove.

It is advantageous if the locking projection can be positively accommodated in the locking depression, and it is particularly advantageous if the locking projection and the locking depression have a locking surface, which bear against one another in the locked condition of the building boards, and then both locking surfaces run essentially parallel to the top side.

When the locking element is embodied in a circular or annular manner in cross section, the locking projection preferably has a latch shoulder that bears against the lateral edge in which the essentially semicylindrical groove is arranged when the locking surfaces bear against one another, and which blocks the locking element against turning back.

The profile of the lateral edge on which the locking element L-shaped in cross section is to be attached, is preferably embodied such that its wall facing towards the core runs obliquely so that the leg of the locking element bearing the locking projection can be placed against this wall and secured there with a pressure-sensitive adhesive connection. The locking element circular or annular in cross section can also be secured in its essentially semicylindrical groove with a pressure-sensitive adhesive connection against an accidental twisting. The adhesive forces of the adhesive connection must naturally be selected such that the torque acting on the locking element through the joining movement is sufficiently high to release the adhesive connection and it can be ensured that the locking element twists. The angle α of the wall close to the core is preferably 70° to the horizontal.

When the locking element has a projection facing outwards in the area in which the two legs adjoin one another, the projection can form the rotation point for the locking element.

Preferably the projection projects over the entire length of the locking element and can be embodied in particular preferably essentially cylindrically.

When a depression is provided in the base of the profile of the first building board, into which depression the projection of the locking element engages, it can be ensured that the rotary motion of the locking element takes place on a circular arc, because the locking element can be held in a stationary manner inside the profile.

A cost-effective production of the locking element is guaranteed when it comprises plastic or a wood material/plastic mixture and can be produced by injection molding. Naturally, the production of the locking element can also be carried out by extrusion. If the locking element comprises metal it can be produced in a forming method, for example, by rolling.

To release the vertical locking it is preferably provided that a rod-shaped element can be pushed from the side into the locking recess, which rod-shaped element spreads out the one leg of the locking element and thus brings it out of engagement with the locking depression.

When a relief groove is provided on the inner edge at which the legs of the locking element adjoin one another, the elasticity of the leg that can be spread apart to release the connection can be adjusted through suitable selection of the size (diameter) of the relief groove.

BRIEF DESCRIPTION OF THE DRAWINGS

Exemplary embodiments of the invention are described in more detail below with the aid of a drawing. The drawings shows.

DETAILED DESCRIPTION OF THE PRESENT INVENTION

Figure 1:
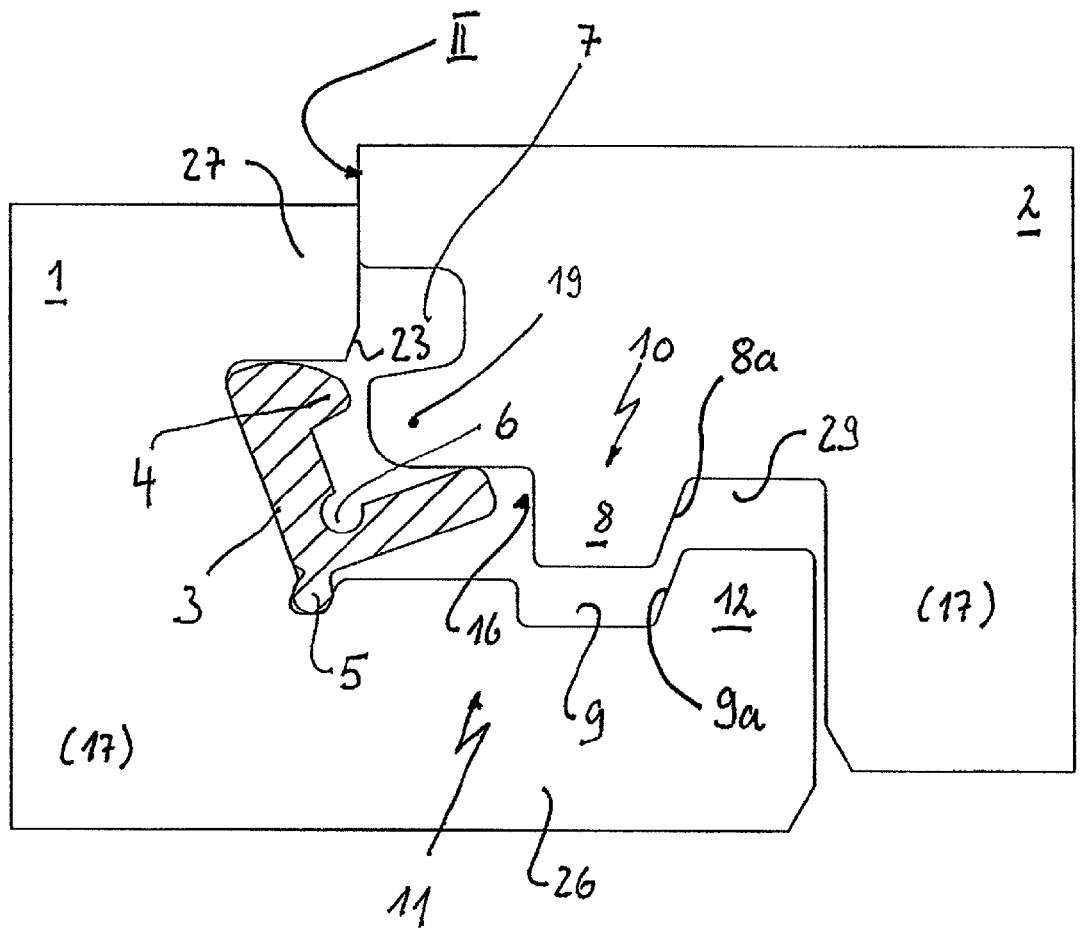
FIG. 1 shows two building boards at the joint in partial view with a first locking element to start joining.
Figure 2:
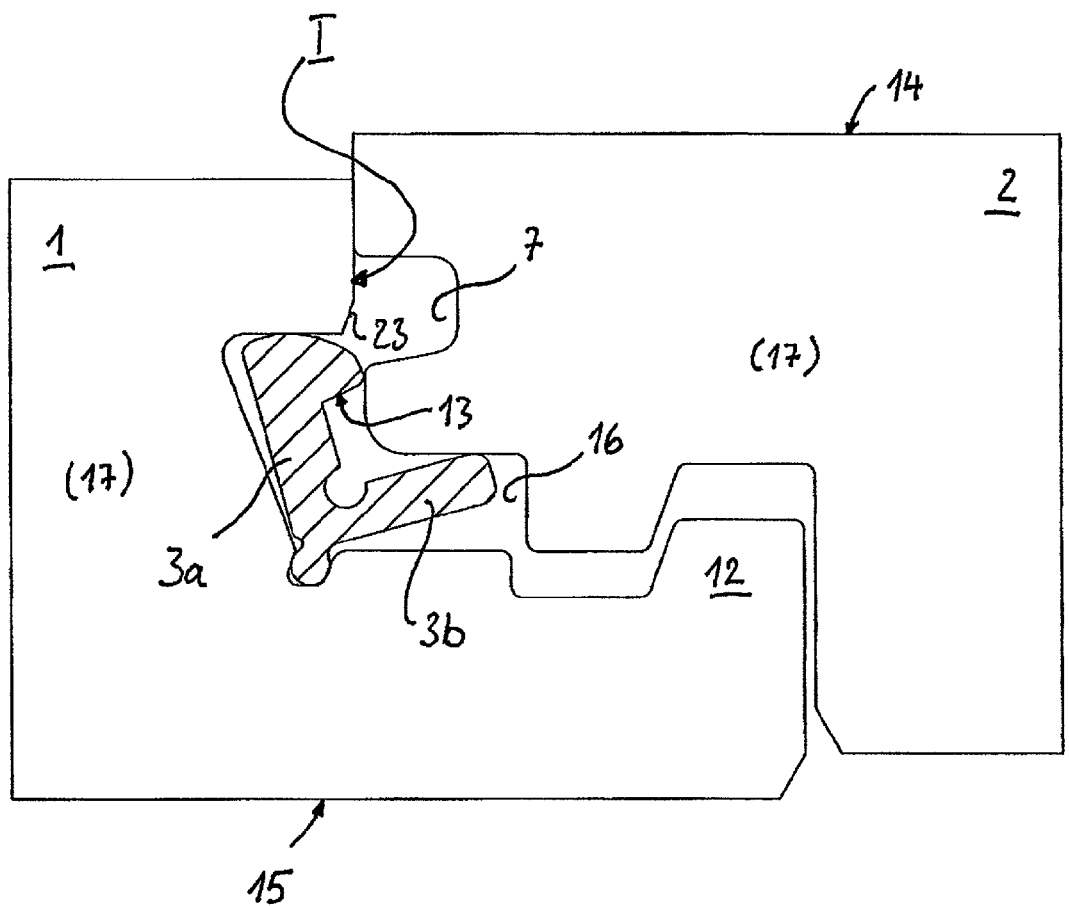
FIG. 2 shows the representation according to FIG. 1 with the connection of the building boards having progressed further.
Figure 3:
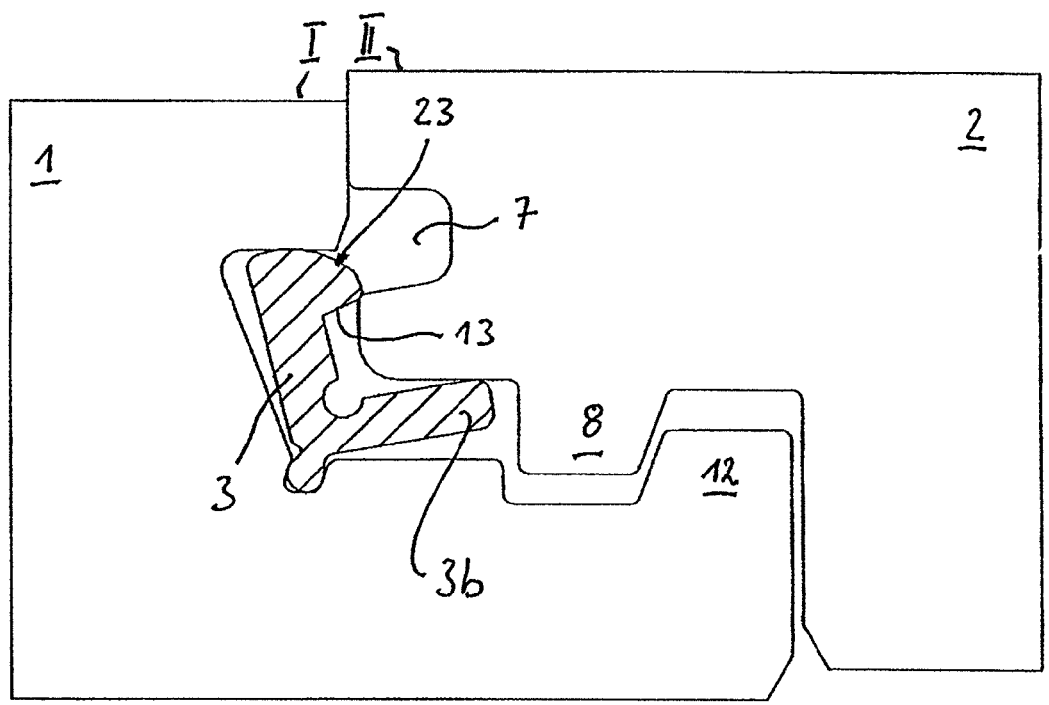
FIG. 3 shows the representation according to FIG. 1 at the start of the locking.
Figure 4:
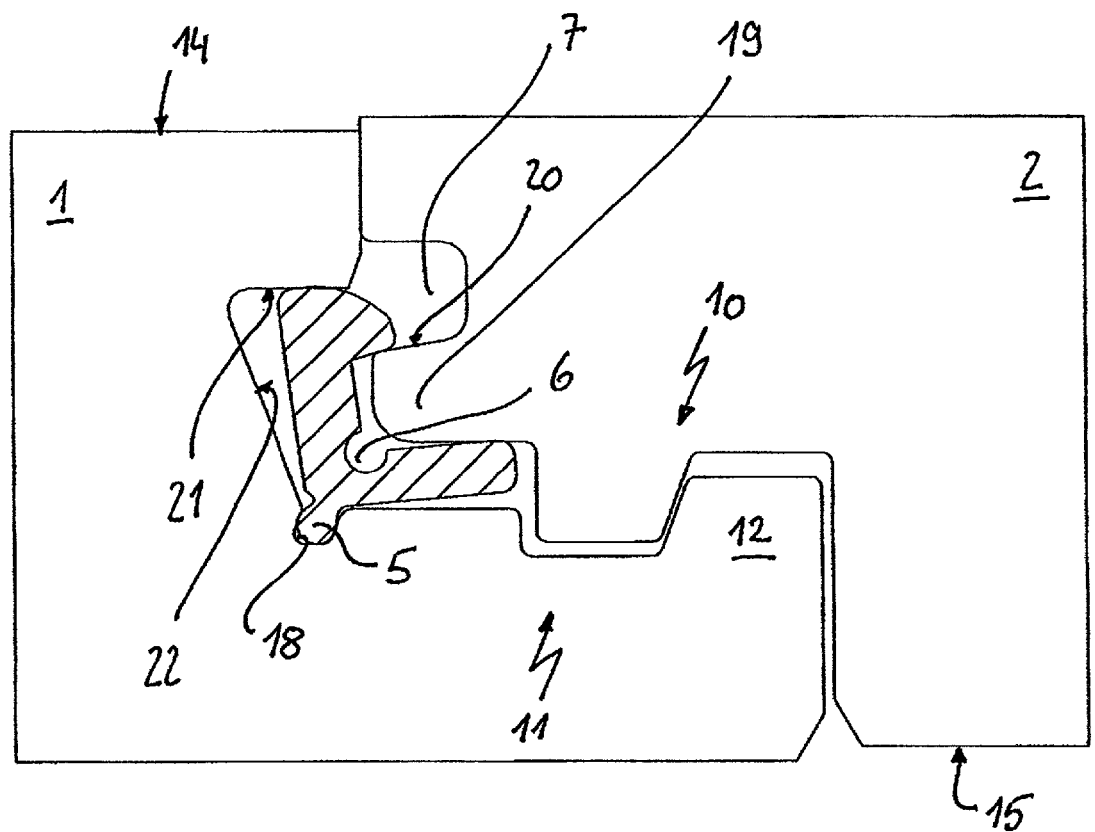
FIG. 4 shows the representation according to FIG. 1 with locking of the building boards having progressed further.
Figure 5:
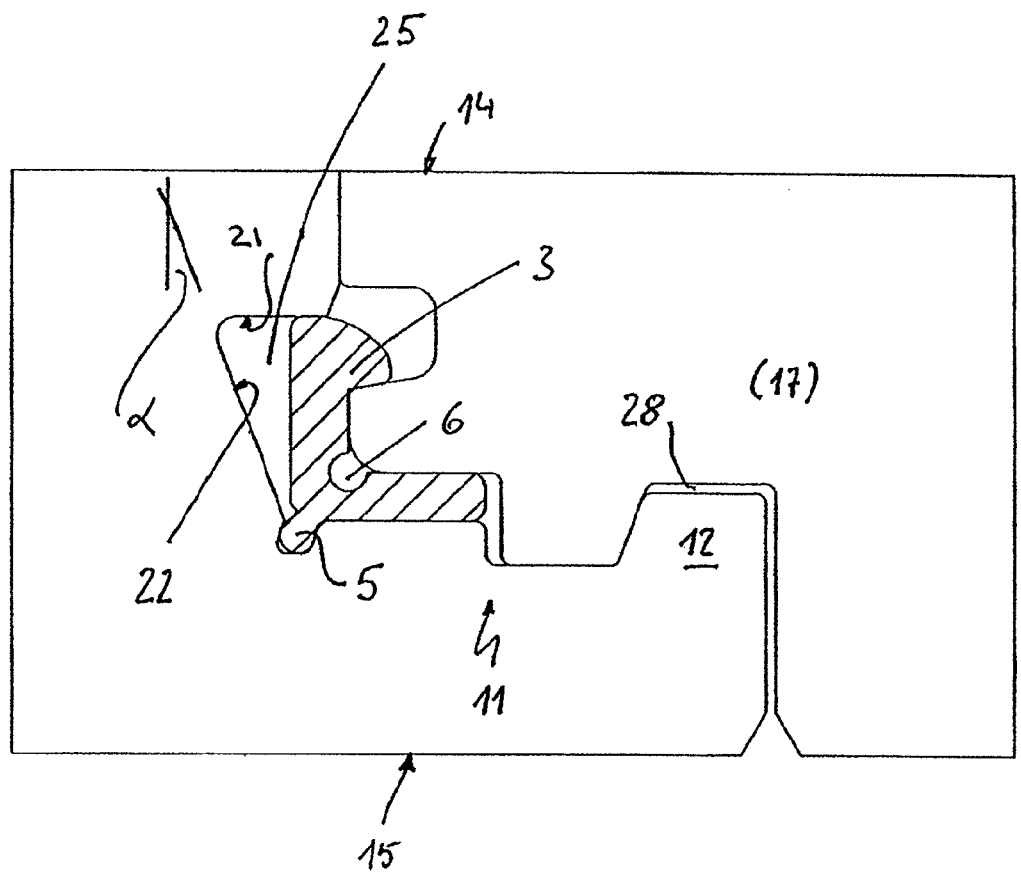
FIG. 5 shows the representation according to FIG. 1 with complete connection and locking of the two building boards.

The invention is to be explained for floor panels that can be connected to one another via the device according to the invention at their longitudinal sides as well as at their transverse sides or else at only one side. The device is provided to connect panels on their transverse sides. The longitudinal sides are preferably connected by angling a new panel into a panel already lying on the floor and subsequent lowering onto the subfloor. The joining movement on the transverse side then takes place essentially in the vertical direction.

As can be seen from the drawing, the panels 1, 2 are provided on their lateral edges I, II with hook-shaped profiles 10,11 corresponding to one another. Even though a first and a second panel is spoken of here, each panel 1, 2 is of course profiled identically and the profiles 10, 11 correspond to one another. The panel 1 is profiled starting from its top side 14 and the panel 2 is profiled starting from its underside 15. The profiles 10, 11 are embodied in a step-shaped manner so that a groove 24 open at the top with an undercut 25 extending in the direction of the core 17 is embodied in the profile 11 of the first panel 1. The profile 10 on the panel 2 embodies a shoulder 8 projecting in the direction of the underside 15 and a groove 7 made transversely in the lateral edge II. The wall 22 of the undercut 25, which wall faces towards the core 17, runs tilted at an angle α of approx. 20° to the vertical. At its lower end the wall 22 merges into a relief groove 18, which is embodied over the full length of the panel 1.

Figure 6:
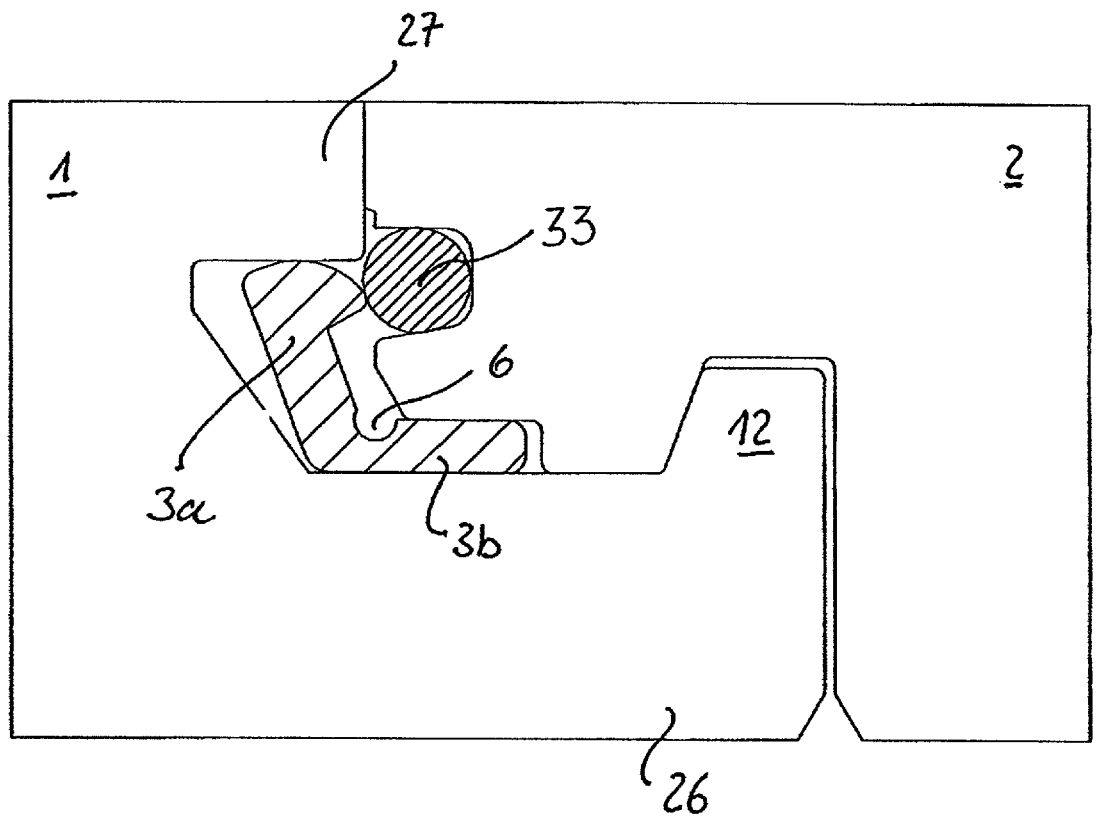
FIG. 6 shows two building boards at the joint in partial view with a release element.
Figure 7:
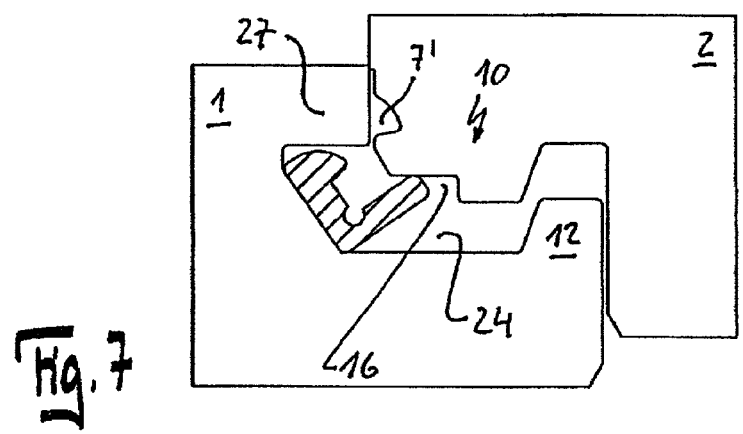
FIG. 7 shows a representation analogous to FIG. 1 with a second locking element.
Figure 8:
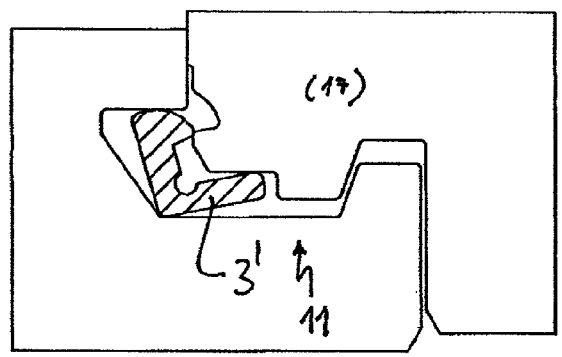
FIG. 8 shows a representation analogous to FIG. 2 with the second locking element.
Figure 9:
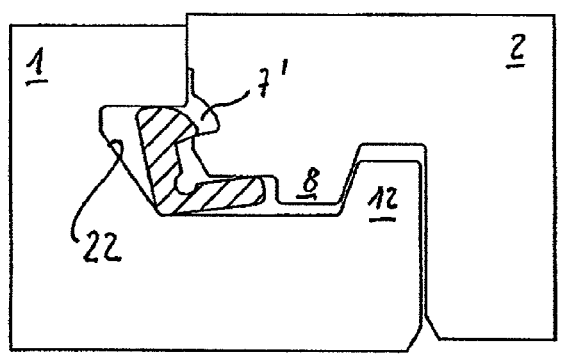
FIG. 9 shows a representation analogous to FIG. 4 with the second locking element.

The essentially rigid locking element 3 is embodied in an L-shaped manner in cross section and has the two legs 3a, 3b, which run essentially at right angles to one another. As defined by the invention, rigid means that the legs 3a, 3b are not embodied in a resilient manner with respect to one another. Naturally, possible elastic deformations depending on the material (e.g., plastic) are fundamentally tolerable. At its upper end the leg 3*a* is provided with a projection 4, the underside of which runs essentially parallel to the lower leg 3*b* and forms a locking surface 13. At their inner transition region the legs 3*a*, 3*b* are undercut as shown in FIG. 6. At the outer transition region of the legs 3*a*, 3*b*, the locking element 3 has a cylindrical projection 5 with which the locking element 3 is placed in the relief groove 18 of the groove 24 and thus held in a stationary manner.

The locking element 3 can be inserted in the panel 1 at the factory or placed into the groove 24 manually during laying. If the locking element 3 is inserted at the factory, it bears with its leg 3*a* against the wall 22 tilted at an angle α and is attached there with an easily detachable pressure-sensitive adhesive so that it is ensured that it remains in this position during transport.

If the panel 2 is lowered to the panel 1, as FIG. 1 shows, the underside of the lower lip 19 of the locking depression 7 formed by a groove rectangular in cross section comes into contact with the leg 3*b* of the locking element 3. As FIGS. 2 to 5 illustrate, through the joining movement, the locking element 3 is pivoted on a circular path about the cylindrical projection 5 until the projection 4 engages in the groove 7 and the locking surface 13 of the locking element 3 is in contact with the locking surface 20 of the groove 7. The lower leg 3*b* then lies in a fitting manner in the groove 16, which together with the profile 11 forms a closed chamber. The locking element 3 is supported on the lower lip 26 and the wall 21 of the upper lip 27 or the undercut 25. In order to prevent as far as possible any frictional forces from forming during the rotary motion of the locking element 3 on the wall 21, the top side of the projection 4 is embodied in an arched manner as far as the locking surface 13. In the locked condition (FIG. 5) the projection 8 of the second panel 2 is supported in the depression 9 of the groove 24 of the first panel 1. The locking in the horizontal direction is carried out by the walls 8*a* running in the same angle of the projection 8 or 9*a* of the depression 9 or of the projection 12, which bear against one another. A clearance 28 is embodied between the projection 12 projecting upward on the lower lip 26 and the depression 29 forming the projection 8.

Figure 10:
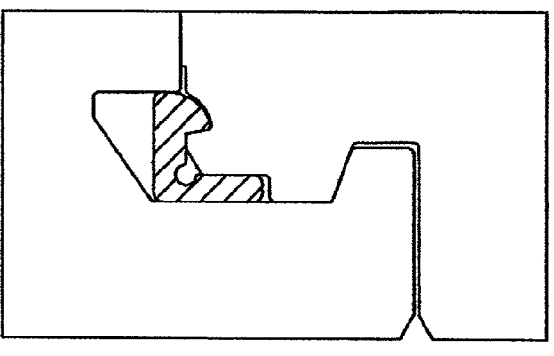
FIG. 10 shows a representation analogous to FIG. 5 with the second locking element.
Figure 11:
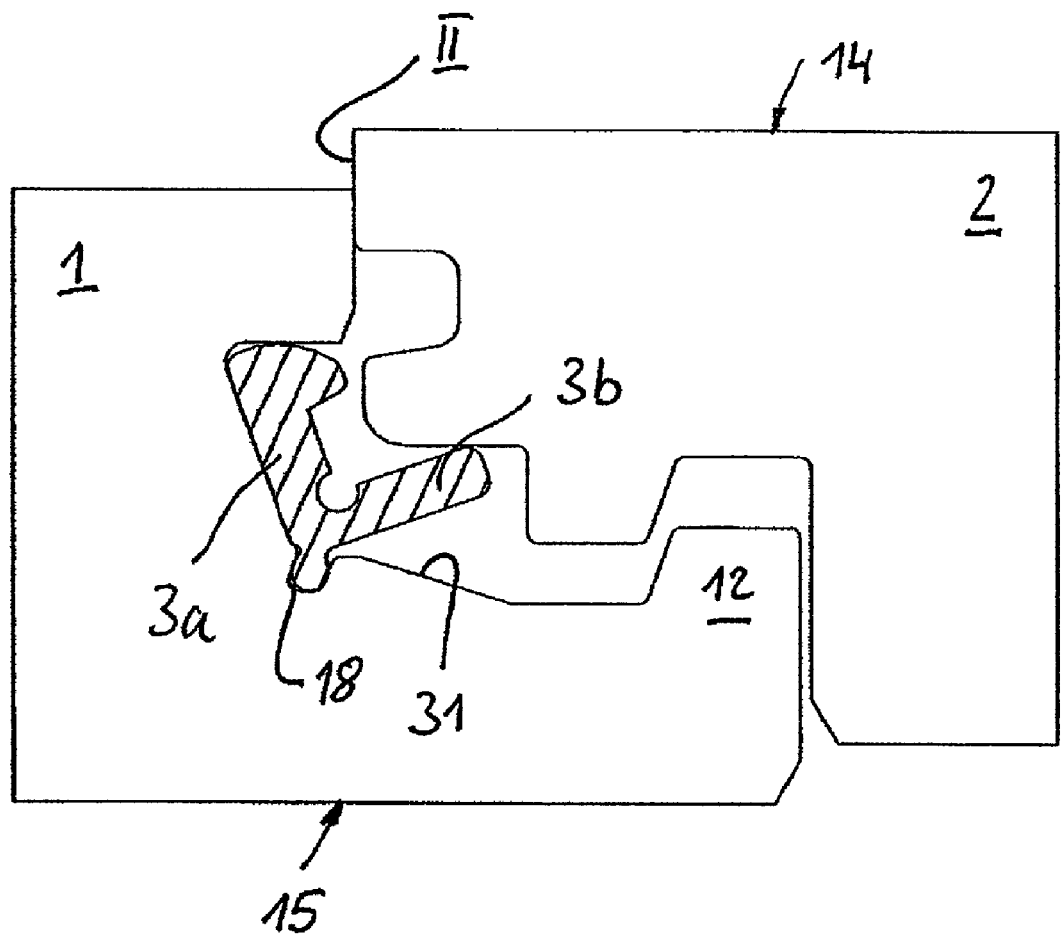
FIG. 11 shows a representation analogous to FIG. 1 with a further exemplary embodiment.
Figure 12:
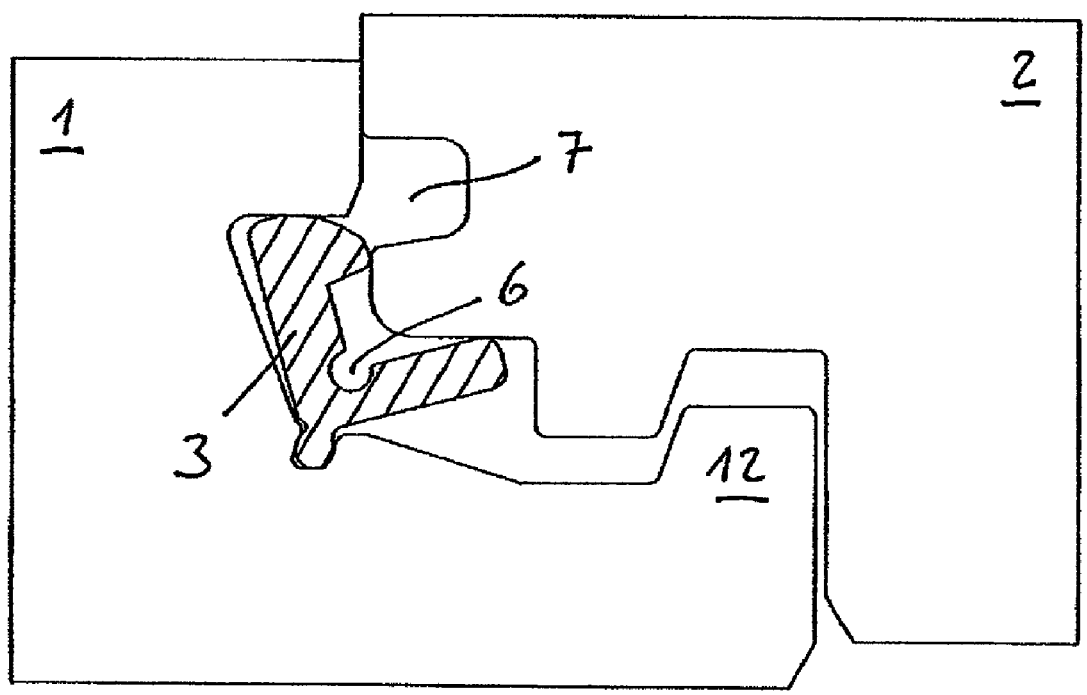
FIG. 12 shows a representation analogous to FIG. 2 with the further exemplary embodiment.
Figure 13:
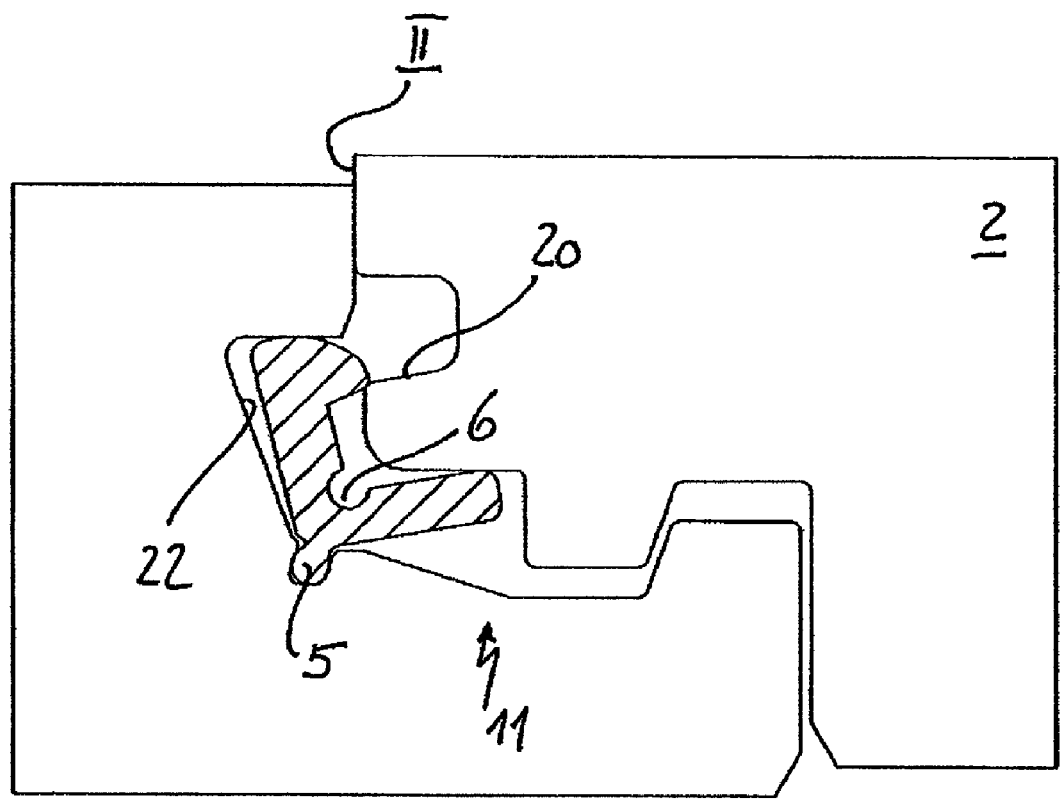
FIG. 13 shows a representation analogous to FIG. 3 with the further exemplary embodiment.
Figure 14:
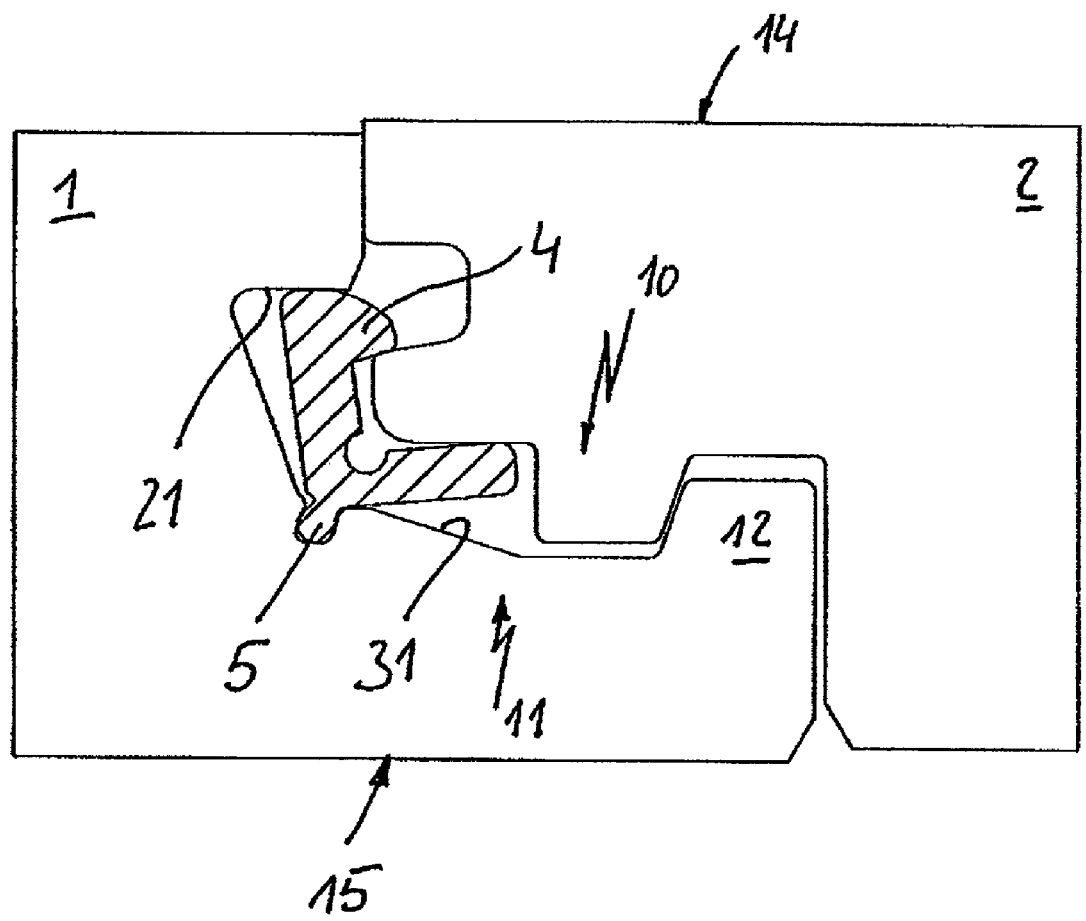
FIG. 14 shows a representation analogous to FIG. 4 with the further exemplary embodiment.
Figure 15:
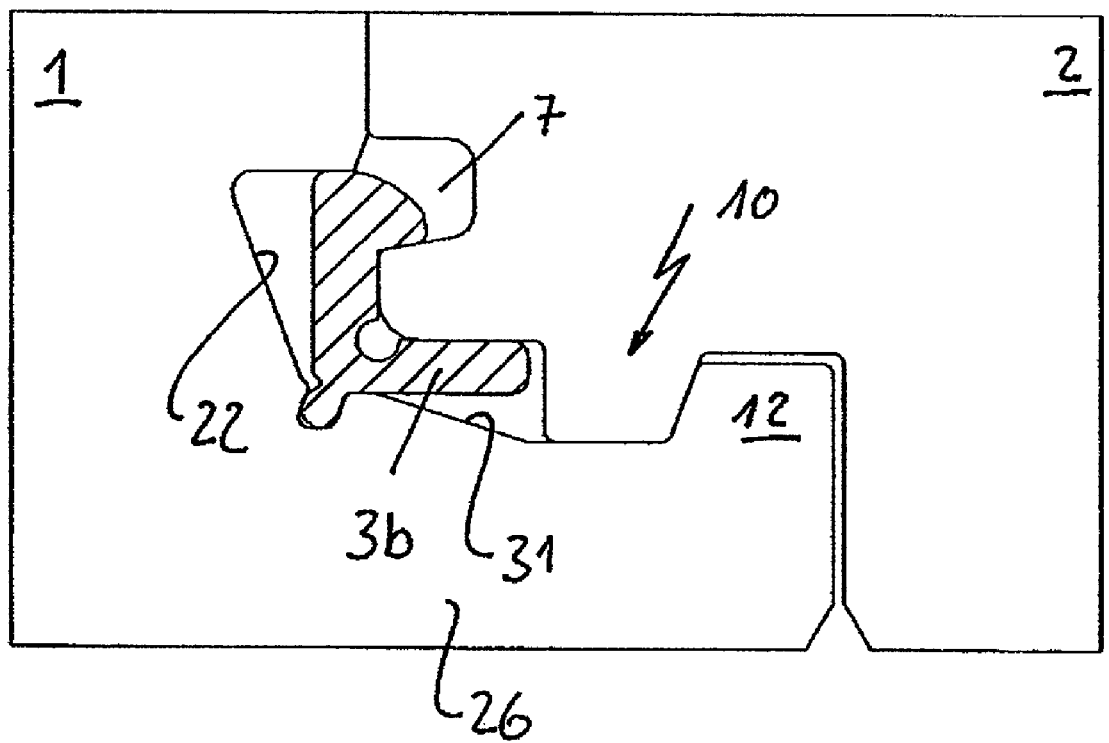
FIG. 15 shows a representation analogous to FIG. 5 with the further exemplary embodiment.

FIGS. 7 through 10 show a locking element 3' that is embodied without a projection for stationary fixing in the groove 24. The groove 7' in the profile 10 is not as pronounced as the groove 7 described above in the panel 2. As FIG. 10 shows, with fully locked panels 1,2, the locking projection 4 is accommodated in the locking depression 7' in a virtually positive manner. However, the manner of the horizontal and vertical locking is identical. The locking mechanism operates identically so that no further description is necessary here.

With the special embodiment of the locking element 3, 3' it is achieved that the pull-out forces, that is, the forces that must act on the panel 2 against the joining direction in order to release the connection, are much greater than the joining forces. With the rotary motion of the locking element 3, 3' during the joining operation, the leg 3*b* acts over its full length as a lever arm around the rotational point of the projection 5 (cf. FIG. 1). The locking element 3, 3' in the locked position bears against the groove 24 at the bottom as well as against the wall 21 of the upper lip 27. In a forced unlocking, the forces are applied via the lower lip 19 to the projection 4. The rotational point of the locking element 3 now does not lie below in the area of the cylindrical projection 5, but above at the contact point of the projection 4 on the wall 21 of the upper lip 27. The maximally effective lever arm corresponds to the horizontal spacing of the in FIG. 5 outermost right point of the locking surface 13 on the hook-shaped projection 4 and the lower end of the upper lip 27 and the lateral edge I of the panel 1. This distance is much shorter than the length of the leg 3*b*, so that for the same torque higher forces are necessary for releasing than for joining. It is also discernible from FIG. 5 that with the start of a movement against the joining direction a jamming of the lower leg 3*b* of the locking element 3 in the groove 16 occurs, which likewise generates forces counteracting an unlocking, which forces can be compensated only through a deformation of the locking element 3. In the exemplary embodiment shown in FIGS. 7 through 10, the lateral edge I of the panel 1 does not run obliquely in its lower area (cf. item 23 in FIG. 1), rather the upper lip 27 is embodied in an essentially rectangular manner. FIG. 10 shows that during rotation of the locking element 3' in a counter clockwise direction at the lower corner of the upper lip 27 a collision between the projection 4 and the edge already occurs that generates forces that counteract a rotation. In order to allow the necessary pull-out forces to be as high as possible, it is therefore advisable to profile the upper lip 27, as shown in this exemplary embodiment, in a rectangular manner at the lateral edge I and not to provide any chamfer in the lower area.

FIG. 6 shows how an unlocking of the panels 1, 2 can take place when the connection is to be deliberately released. To this end a rod element 33 can be inserted laterally from outside into the groove 7 of the panel 2, whereby the leg 3*a* is spread and loses contact with the groove 7, so that the panel 2 can be pivoted upwards. The elasticity of the leg 3*a* with respect to the leg 3*b* can be adjusted via the size of the recess 6.

Figure 16:
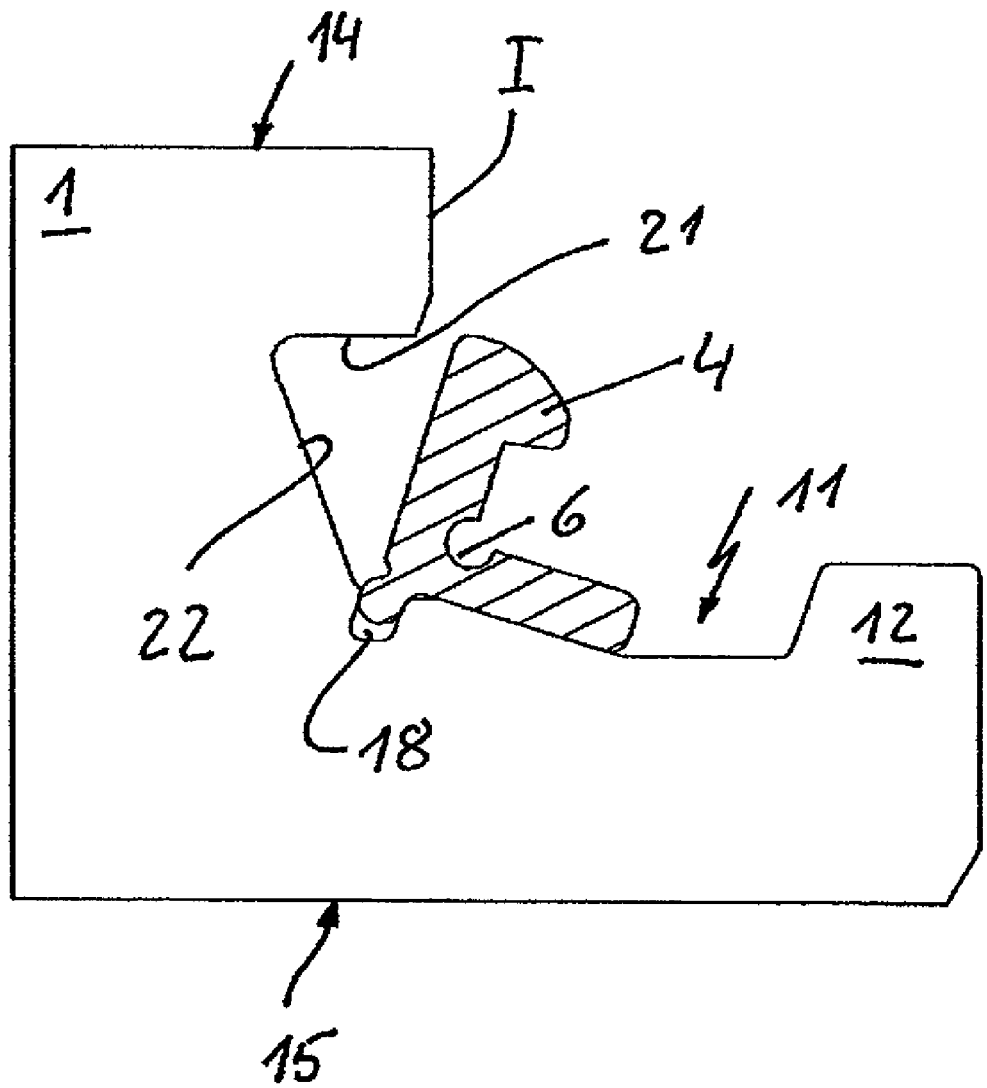
FIG. 16 shows the insertion of the locking element according to the first exemplary embodiment in a first step.
Figure 17:
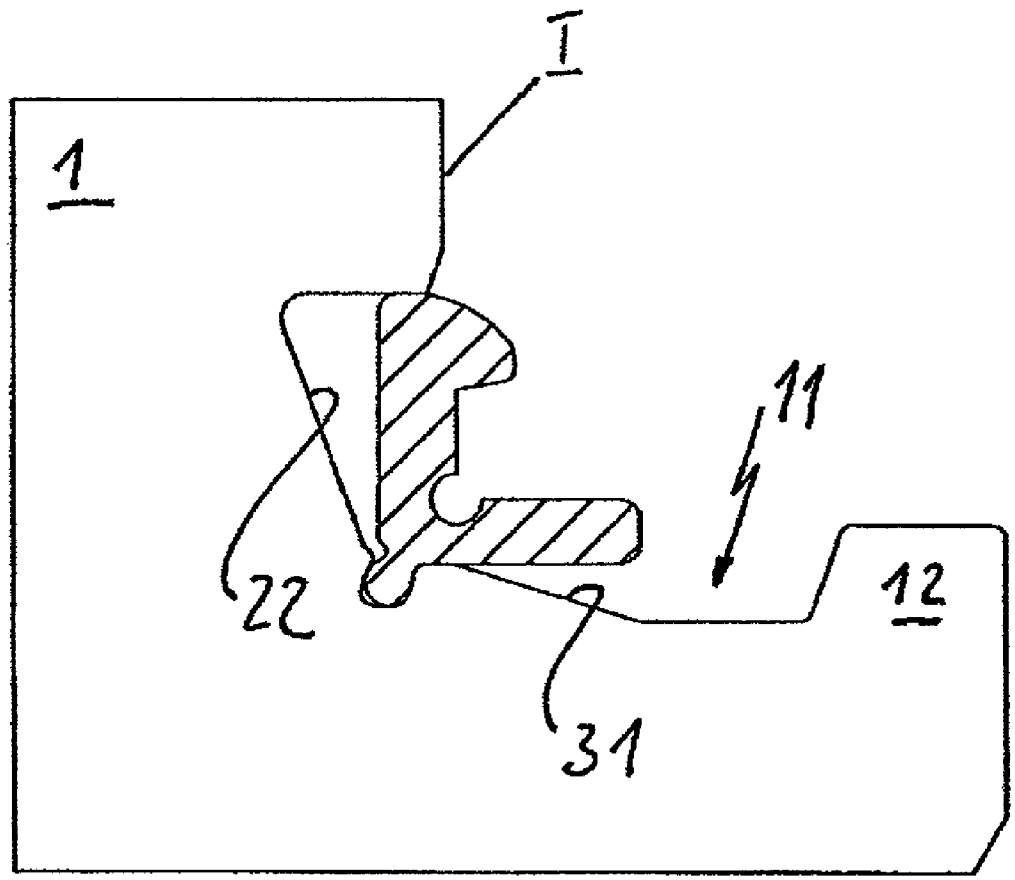
FIG. 17 shows the insertion of the locking element according to the first exemplary embodiment in a second step.
Figure 18:
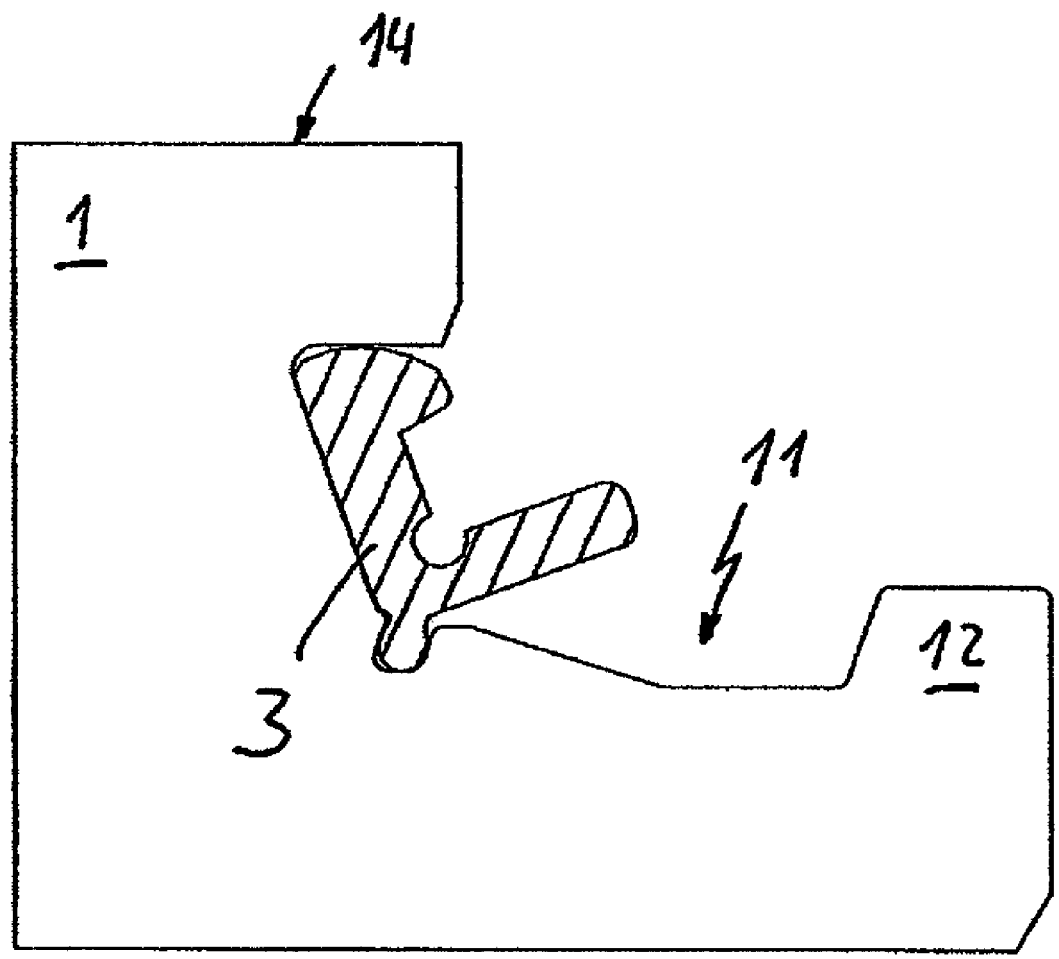
FIG. 18 shows the insertion of the locking element according to the first exemplary embodiment in a third step.
Figure 19:
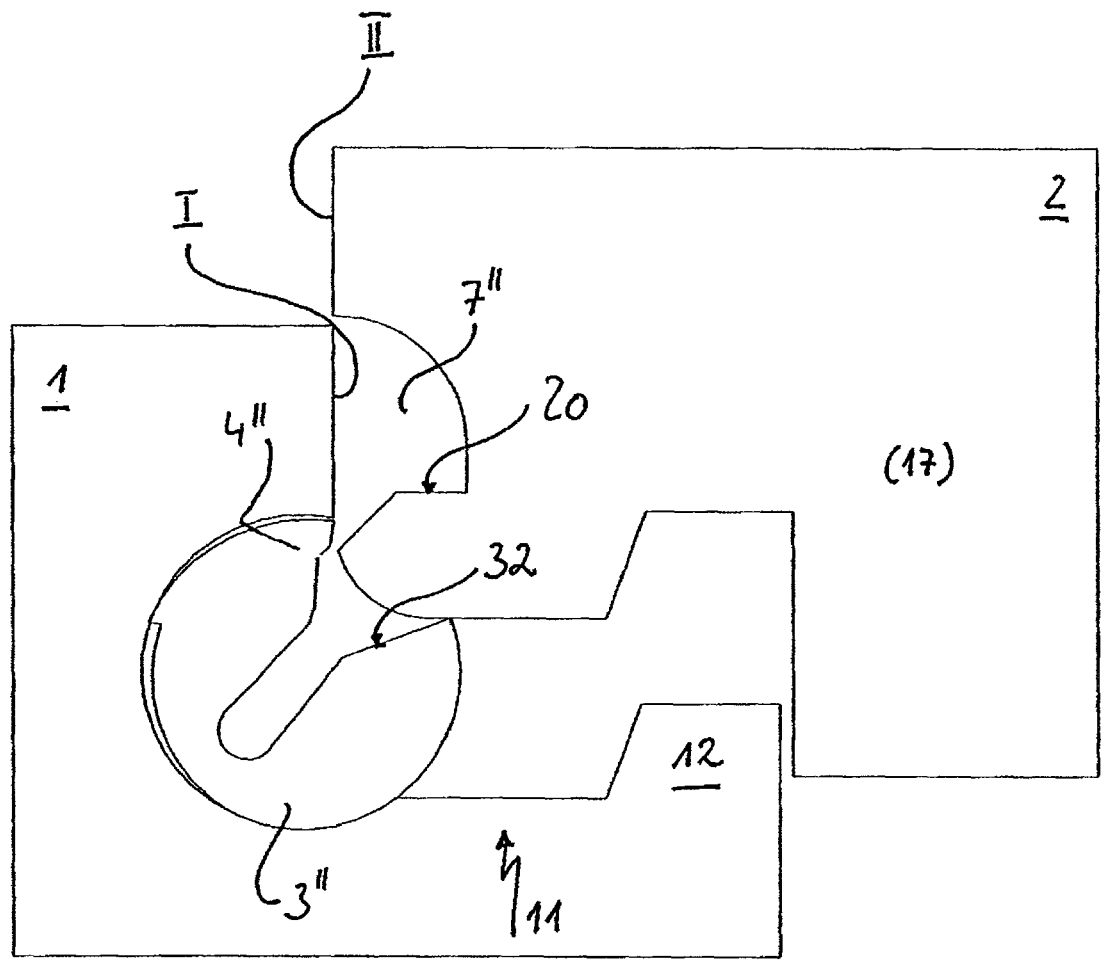
FIG. 19 shows two building boards at the joint in partial view with a third locking element at the start of joining.
Figure 20:
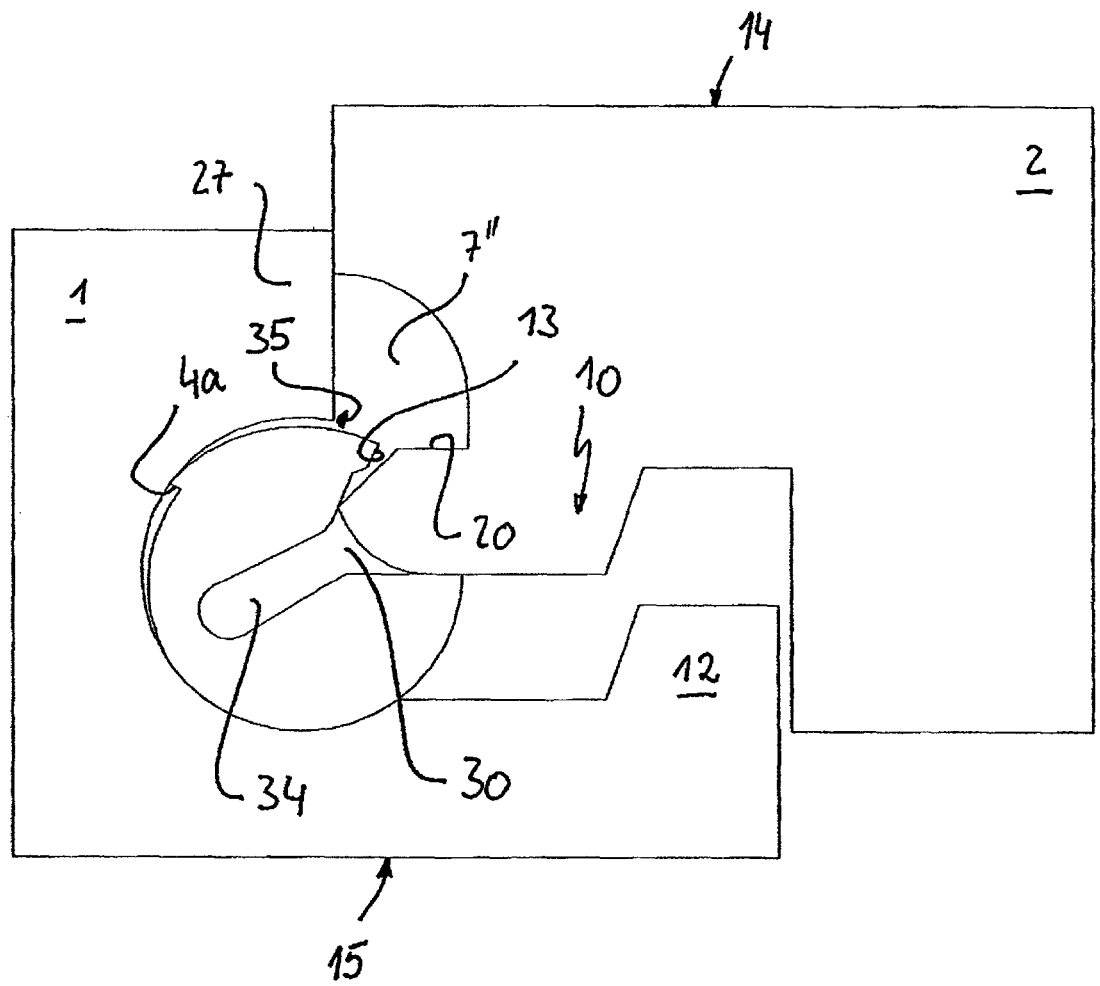
FIG. 20 shows a representation analogous to FIG. 2 with the third locking element.
Figure 21:
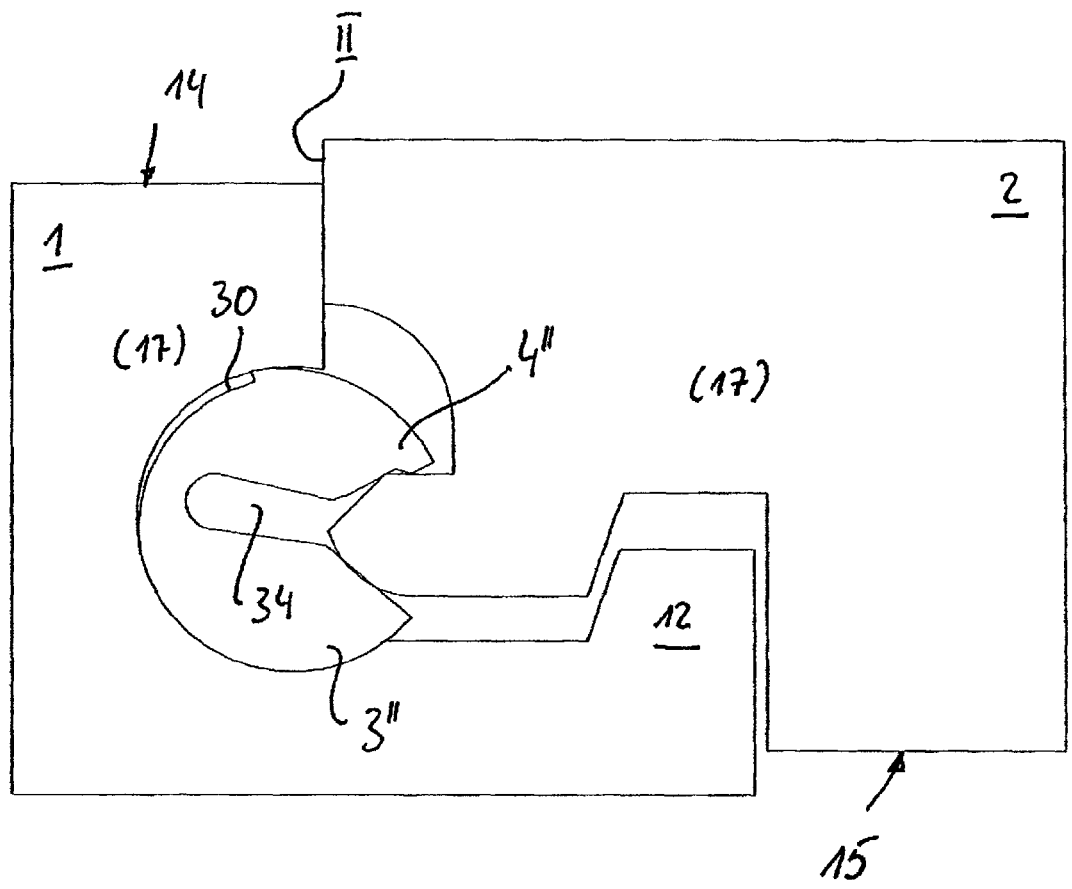
FIG. 21 shows a representation analogous to FIG. 2 with the third locking element.

FIGS. 11 through 15 show a special embodiment of the profile 11 of the first panel 1. The wall 31 of the profile 11, which wall adjoins the recess 18, runs obliquely here. With full locking of the two panels 1, 2 the lower leg 3*b* of the locking element 3 thus does not bear against the lower lip 26. It has been shown that with a profile 11 of this type the locking element 3 can be inserted into the relief groove 18 particularly easily. To insert the locking element 3, said locking element with its leg 3*b* is first placed on the inclined wall 31 and then pushed into the relief groove 18 (FIG. 16). Subsequently the locking element 3 is then pivoted in the direction of the inclined wall 22 in a counter clockwise manner and attached there by means of a pressure-sensitive adhesive.

Figure 22:
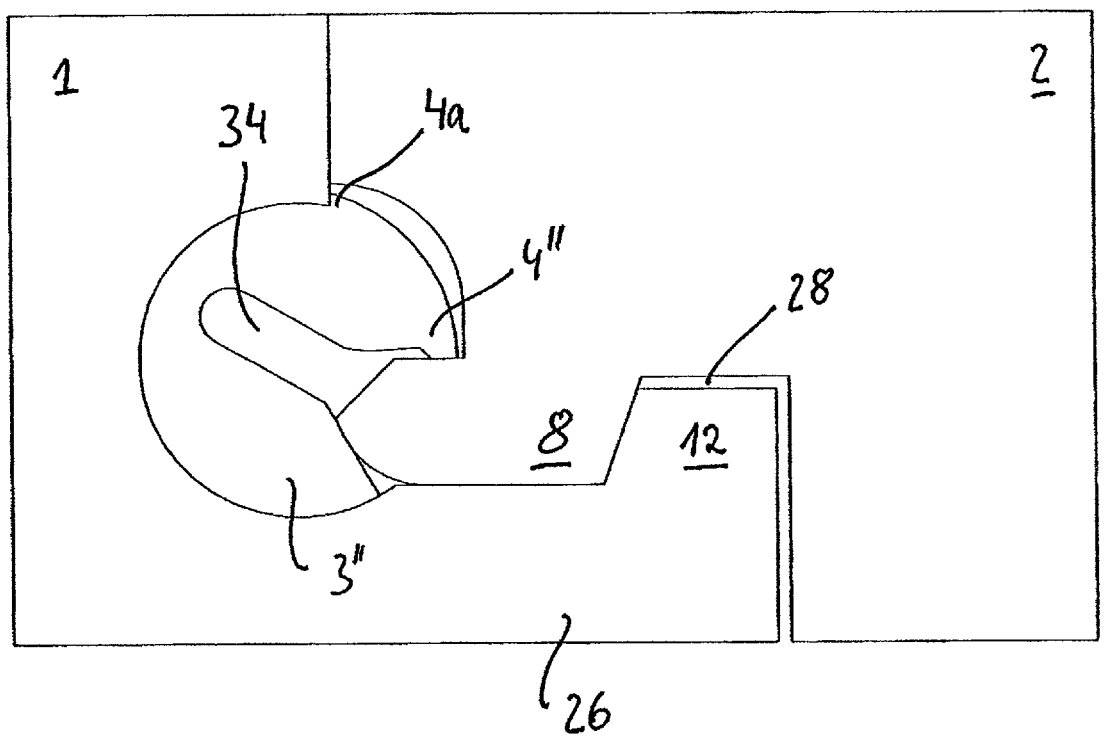
FIG. 22 shows a representation analogous to FIG. 4 with the third locking element.
Figure 23:
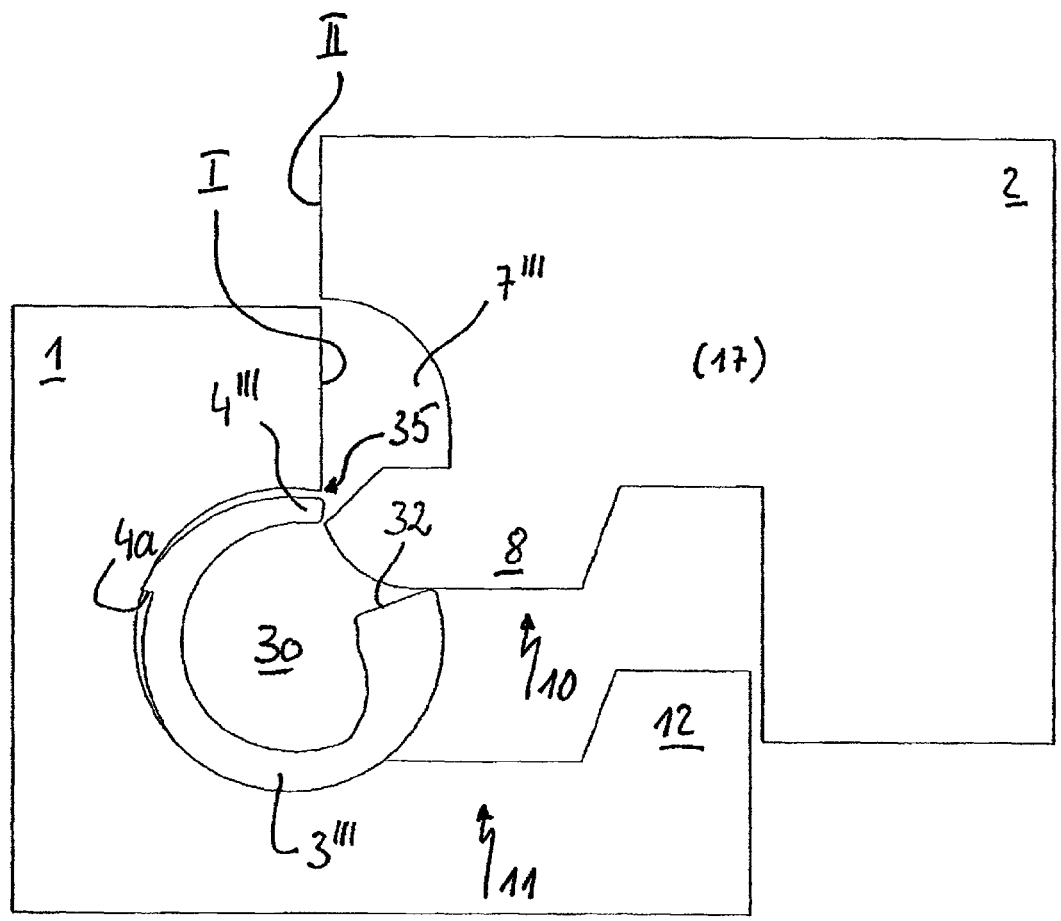
FIG. 23 shows a representation analogous to FIG. 5 with the third locking element.
Figure 24:
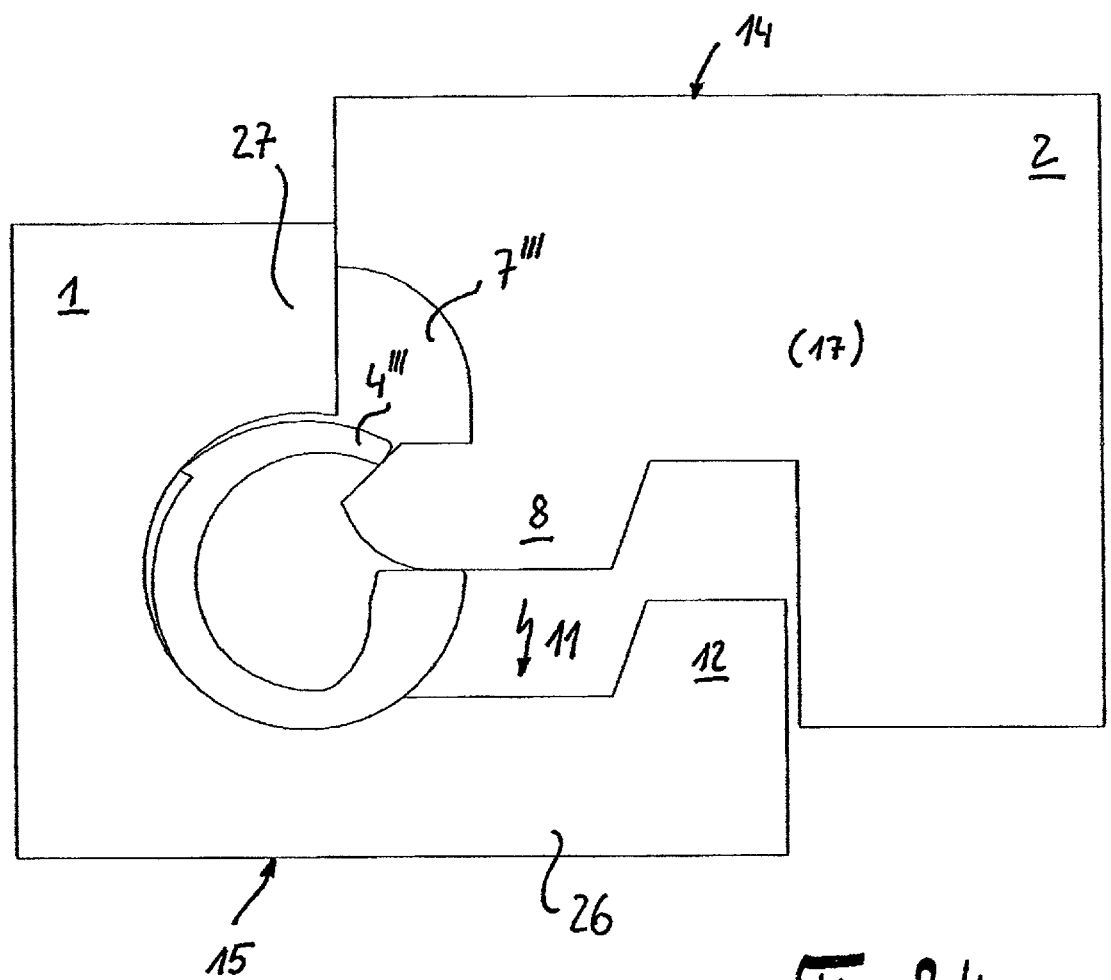
FIG. 24 shows a representation analogous to FIG. 2 with the fourth locking element.
Figure 25:
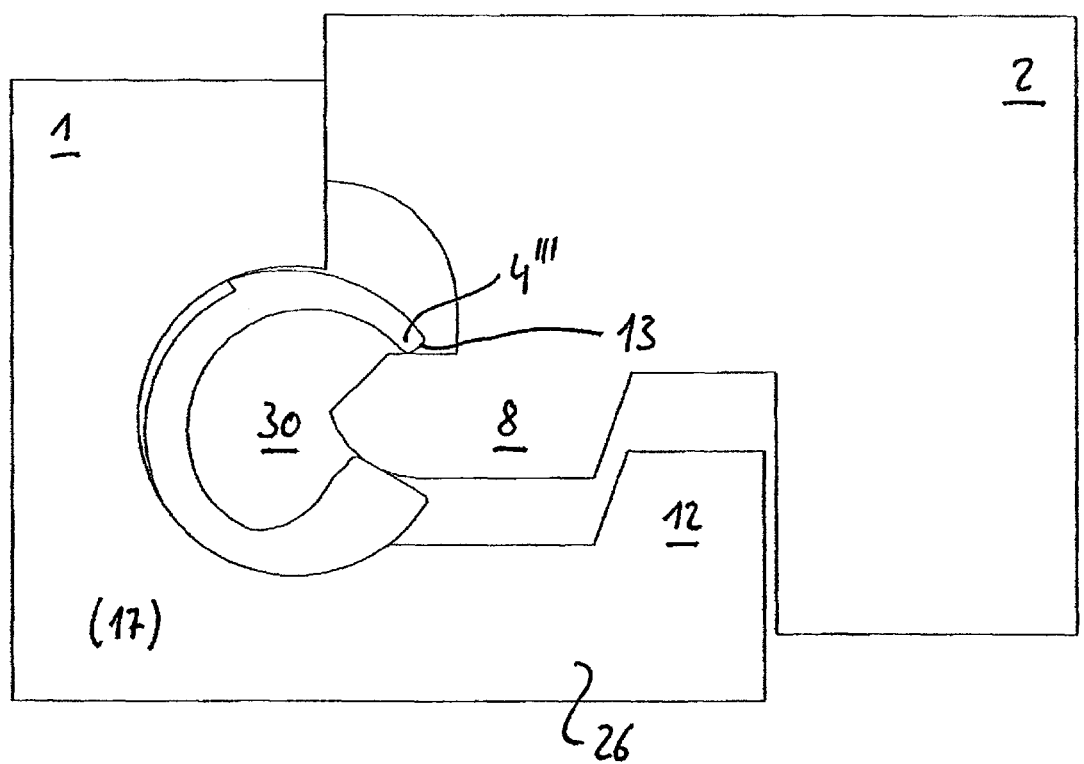
FIG. 25 shows a representation analogous to FIG. 4 with the fourth locking element.
Figure 26:
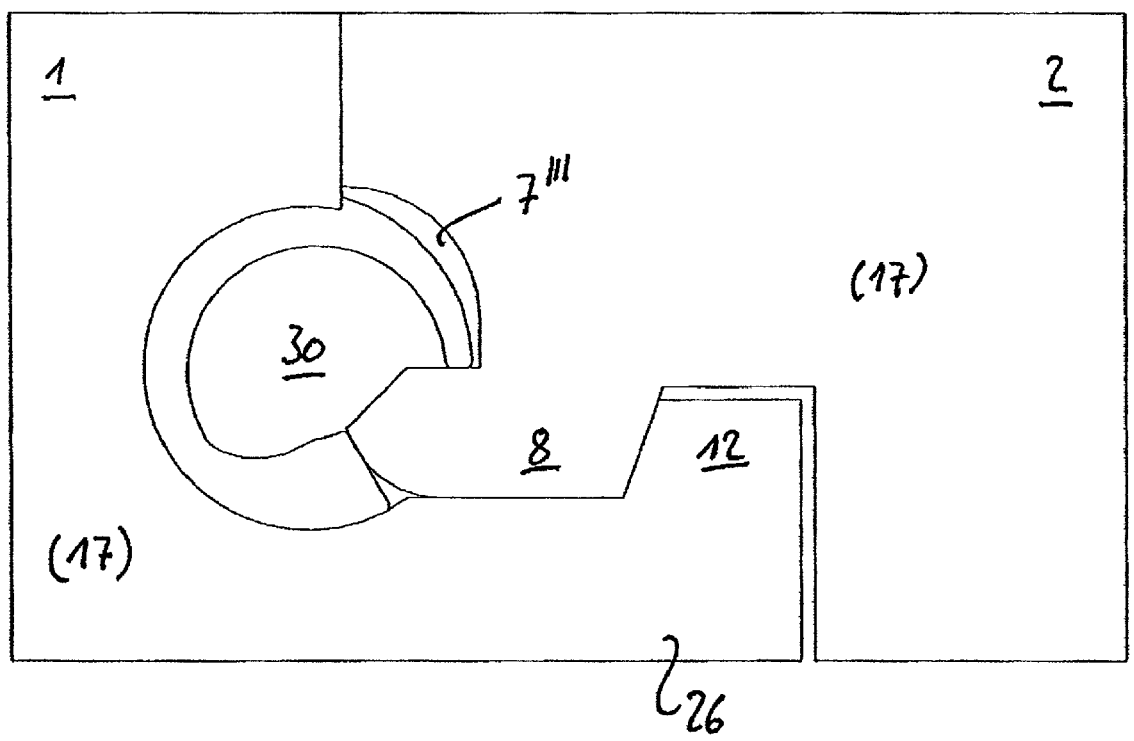
FIG. 26 shows a representation analogous to FIG. 5 with the fourth locking element.

FIGS. 19 through 22 show another exemplary embodiment of a locking element 3". In cross section the locking element 3" is embodied in an essentially circular manner. To embody the locking surface 13 and an edge 32 functionally analogous to the leg 3*b*, a circle sector is cut out. The profile 11 of the panel 1 is embodied such that an essentially semicylindrical groove 30 is embodied, in which the locking element 3" is inserted. On the outer wall opposite the locking surface 13, the locking projection 4" is provided with a latch shoulder 4*a*, which, as shown in FIG. 22, bears against the lateral edge I of the panel 1 in the fully locked position, which prevents the locking element 3" from turning back. So that the latch shoulder 4*a* can snap behind the joint edge 35, the locking element 3" is embodied in an elastic manner. To increase the elasticity it preferably has a slot 34 starting from the circular sector, which slot projects radially out over the center of the locking element 3'. In cross section the locking recess 7" is embodied essentially in a triangular manner.

FIGS. 23 through 26 show another exemplary embodiment of a locking element 3'". The locking element 3" is here embodied in an annular manner, wherein the annulus naturally is not closed. Its one end is formed by the locking projection 4'" and its other end the edge 32 analogous to the edge 32 of the locking element 3". Both locking elements 3"

and 3''' can be attached in the semicylindrical groove 30 by means of a pressure-sensitive adhesive in order to prevent an accidental twisting during transport. If the panel 2 is lowered vertically onto the panel 1, the locking element 3'', 3''' rotates during the further lowering movement in a clockwise manner and then latches with the locking projection 4'', 4''' into the locking depression 7'', 7'''. The locking element 3''' annular in cross section is also provided on the locking projection 4''' with a latch shoulder 4a, which due to the elasticity of the locking element 3''' snaps behind the joint edge 35 and in the fully locked position bears against the lateral edge I of panel 1 and prevents the locking element 3''' from turning back.

All of the locking elements 3, 3', 3'', 3''' can comprise plastic, a wood material/plastic mixture or a metal. Plastic has the advantage that it can be processed in injection molding or extrusion methods. A wood material/plastic mixture can be processed in an extrusion method and a locking element 3, 3', 3'', 3''' of metal can be produced in a forming method, for example by rolling.

The invention claimed is:

1. A device for connecting and locking two building boards on their longitudinal sides and/or transverse sides in a horizontal and vertical direction through an essentially vertical joining movement, the building boards have a top side and an underside, on their lateral edges (I, II) to be connected to one another are provided with profiles corresponding to one another, and a locking element with a locking projection provided in the profile of the first building board, the locking projection interacts with a locking depression provided in the profile of the second building board such that the two building boards are automatically locked in the vertical direction with the joining movement, the locking element being embodied in an essentially rigid manner and the locking projection being brought into the locking depression through a rotary motion of the locking element, wherein the locking element is embodied in cross section in a substantially circularly c-shaped manner.

2. The device according to claim 1, wherein the locking element is embodied in cross section in an annular c-shaped manner.

3. The device according to claim 2, wherein the locking projection has a latch shoulder that bears against the lateral edge of the first building board when locking surfaces bear against one another, and blocks the locking element against turning back.

4. The device according to claim 3, wherein the latch shoulder is provided as a stepped feature.

5. The device according to claim 3, wherein the latch shoulder is provided at a transition on a portion of the substantially circularly c-shaped locking element.

6. The device according to claim 1, wherein the locking projection is positively accommodated in the locking depression.

7. The device according to claim 1, wherein the locking projection and the locking depression have a locking surface, which bear against one another in the locked condition of the building boards, and then both the locking surfaces run substantially parallel to a top side of the building boards.

8. The device according to claim 1, wherein the locking element has a shoulder facing outwards in the area in which the two building boards adjoin one another.

9. The device according to claim 1, wherein the locking element is arranged in essentially a substantially semi-cylindrical groove.

10. The device according to claim 9, wherein the locking element is releasably attached in the groove.

11. The device according to claim 1, wherein the locking element comprises plastic.

12. The device according to claim 11, wherein the locking element is produced in an injection molding or extrusion method.

13. The device according to claim 1, wherein the locking element comprises a wood material/plastic mixture.

14. The device according to claim 13, wherein the locking element is produced in an extrusion method.

15. The device according to claim 1, wherein the locking element comprises metal.

16. The device according to claim 15, wherein the locking element is produced in a forming method.

17. The device according to claim 16, wherein the locking element is produced by rolling.

18. The device according to claim 1, wherein a core of the building boards comprises a wood material or wood material/plastic mixture.

19. The device according to claim 18, wherein the core of the building boards is HDF or MDF.

* * * * *